United States Patent
Abdurachmanov

(10) Patent No.: US 6,727,600 B1
(45) Date of Patent: Apr. 27, 2004

(54) SMALL UNDERWATER GENERATOR WITH SELF-ADJUSTING AXIAL GAP

(76) Inventor: Ilich Abdurachmanov, 150-15 79th Ave., Flushing, NY (US) 11367

( * ) Notice: Subject to any disclaimer, the term of this patent is extended or adjusted under 35 U.S.C. 154(b) by 95 days.

(21) Appl. No.: 10/298,284

(22) Filed: Nov. 18, 2002

(51) Int. Cl.[7] .................................................. H02K 9/00
(52) U.S. Cl. .............................. 290/54; 290/43; 310/52; 310/61; 322/33
(58) Field of Search ....................... 290/43, 54; 310/52, 310/61; 322/33

(56) References Cited

U.S. PATENT DOCUMENTS

| | | | |
|---|---|---|---|
| 2,127,847 A | | 4/1938 | Schulte |
| 2,634,375 A | | 4/1953 | Guimbal |
| 3,209,156 A | | 9/1965 | Struble |
| 4,616,298 A | * | 10/1986 | Bolson .................... 362/192 |
| 4,720,640 A | * | 1/1988 | Anderson et al. ............ 290/43 |
| 5,315,159 A | * | 5/1994 | Gribnau ....................... 290/55 |
| 5,347,188 A | * | 9/1994 | Iseman et al. ............ 310/68 D |
| 5,627,419 A | | 5/1997 | Miller |
| 5,702,273 A | * | 12/1997 | Cho et al. ...................... 440/6 |
| 6,104,097 A | * | 8/2000 | Lehoczky ..................... 290/54 |
| 2003/0137149 A1 | * | 7/2003 | Northrup et al. ............. 290/44 |

* cited by examiner

Primary Examiner—Nicholas Ponomarenko
(74) Attorney, Agent, or Firm—Boris Leschinsky

(57) ABSTRACT

An underwater generator contains a three-phase electromagnetic coil system imbedded in a stator to form an external face surface perpendicular to its axis. A rotor contains radial vanes and a system of alternating permanent magnets imbedded onto a peripheral ring outside of the vanes so as to form an internal face surface positioned next to the external face surface and forming an axial gap therebetween. The rotor also contains a series of radial channels connecting the central area of the hollow shaft to the area of the axial gap. The rotor is spring-loaded and is capable of moving along its axis so that the axial gap can be changed. An auxiliary pump is provides to pump water into the axial gap and therefore create a hydrostatic pressure on the rotor to counteract the electromagnetic attraction forces generated during the operation of the device. The flow of the auxiliary pump is chosen in such a way as to maintain the axial gap within the range of 0.15 to 0.20 mm regardless of the incoming water current or any wear of the generator components. Such wear may result from abrasion caused by the sand or other particles carried by the water current. The underwater generator can be used most advantageously in small rivers and other similar sources of water currents frequently contaminated with sand particles. The generator of the invention has long operational life and maintains high efficiency of energy generating over a wide range of operating parameters.

10 Claims, 2 Drawing Sheets

SMALL UNDERWATER GENERATOR WITH SELF-ADJUSTING AXIAL GAP

BACKGROUND OF THE INVENTION

The present invention relates generally to combined turbine and generator units for hydroelectric plants deriving electrical energy from the subsurface water currents. It is especially useful in medium and small head plants for use in remote areas where regular electrical grid is not available. More specifically, the invention relates to hermetically sealed generators with self-adjusting axial gap.

Small underwater generators are generally known in the prior art. They typically include a turbine portion rotating a shaft and a generator portion for transferring into electricity of the kinetic energy of magnetic coils and alike of the rotor passing by the stationary coils of the stator. For underwater application, this general approach suffers from two problems: first, the shaft needs to be sealed, and second, a brush contact system for energizing the rotating coils has to be provided. The problem of longevity arises in submerged generators when the rotary shaft seal wears out and water gains access to the inside of the generator unit. Another problem stems from the wear of the electrical contact brushes, which require periodic replacement necessitating removal of the unit from the water.

Sealed underwater generators have been proposed in the prior art. One example of such is shown in the U.S. Pat. No. 3,209,156 by Struble, which is incorporated herein in its entirety. It shows a sealed stator containing a permanently attached shaft. An impeller is mounted on the shaft and contains a series of permanent magnets. Underwater current causes the impeller to rotate and therefore to move the permanent magnets next to the electrical coils of the stator of the unit whereby electricity is generated. Effectiveness of the generator directly depends on the optimal gap between the permanent magnets and the coils of the stator. This design incorporates a bearing system to support the rotation of the impeller, which is typical for these devices. The longevity of the device is limited due to the wear of the bearings causing the axial shift in the position of the impeller and therefore a decline in generating capacity of the device.

Guimbal shows another example of the permanent magnet underwater generator in the U.S. Pat. No. 2,634,375. The generator unit is coupled directly with the turbine unit, which obviates the need for a complex gearbox or another type of a transmission. This design relies on a source of pressurized oil to fill in the space of the generator to lubricate it and to transfer away the heat that is generated by the unit. Such a provision may not be practical in remote areas where the generator of this type may be used most advantageously.

A further yet example of the small generator is shown in the U.S. Pat. No. 2,127,847 by Schulte. A nautical instrument measures a speed of the boat to which it is mounted. A generator has a small impeller equipped with a series of permanent magnets, which is passively turned on by the moving boat. The faster the boat is the more electricity is generated therefore the speed may be estimated based on the generator output. There is no provision again here for any self-adjustment of the axial gap due to the wear of the axial bearing system, which ultimately may cause a decline in the instrument accuracy.

Finally, a self-adjusting axial gap design of the motor/generator is shown by Miller in the U.S. Pat. No. 5,627,419. A spring-loaded flywheel is shown to contain a series of permanent magnets rotating next to a stator having a series of electromagnetic coils. When engaged with the stator, the gap is maintained small due to the tapered design of the flywheel and the stator and the axial forces generated by the torque of the device. When the flywheel is allowed to rotate freely, it shifts axially away from the stator so that the electromagnetic drag is minimized. This design has two distinct main positions of the flywheel and does not allow for infinite position adjustment in response to the wear of the axial bearing.

The need exists therefore for a small sealed underwater generator having a simple and reliable design for use in remote areas with high reliability and longevity. The need also exists for an underwater generator capable of working in small rivers and alike. In such conditions, water flow may be heavily contaminated with floating particles such as sand. Sand filled water may cause rapid wear of the components of the traditional underwater generators resulting in an increase of the axial gap of the turbine and a decline in energy generating capacity.

SUMMARY OF THE INVENTION

Accordingly, it is an object of the present invention to overcome these and other drawbacks of the prior art by providing a novel sealed directly coupled underwater generator with self-adjusting axial gap to maintain the high electrical energy generating capacity despite the wear of its components.

It is another object of the present invention to provide a sealed generator with long operational life and extended periods between scheduled maintenance and repairs.

It is a further object of the present invention to provide an underwater generator capable of functioning in water currents heavily contaminated with floating particles such as sand.

It is a further yet objective of the present invention to provide an underwater generator with a capacity to maintain the optimal axial gap over a wide range of operating parameters including changes in the upcoming water current.

These objectives of the invention are achieved by providing a generator having its rotor directly coupled to its turbine. The three-phase synchronous generator includes a series of permanent magnets sealingly incorporated into its rotor. The rotor is rotated on a shaft by the incoming water flow in such a way that the permanent magnets move about and in close vicinity to the alternating electromagnetic coils of the stator. The objectives of the present invention are realized by providing a rotor with the ability for axial shift along the shaft. The rotor is spring loaded at the end of the shaft to force it towards the housing in the direction opposite the flow direction of the incoming water current.

The rotor is provided with inside channels and cavities, which are organized in such a way that the axial gap between the rotor and the stator is maintained in the optimal range. The gap is defined by a balance between the force of the spring and the axial pressure of the water current regardless of the wear status of the bearings. This is achieved for the most part by providing a constant flow auxiliary pump driven by the turning rotor. The pump is infusing a constant amount of water along the vane channels in the rotor and into the gap on the periphery between the rotor and the stator. That flow develops an axial hydrodynamic force against the rotor. A combination of that force in addition to an electromagnetic force and the force of the spring determines the final axial gap between the rotor and the stator.

Wear of the rotor from the incoming flow of suspended particles of sand and alike result in increase of the gap but that in turn leads to reduction on flow resistance from the auxiliary pump and subsequent drop in the hydrodynamic forces component. A balance of forces is therefore disturbed and the rotor is shifted closer to the stator by the spring. This automatic action increases the flow resistance, raises the hydrodynamic forces and brings the axial gap back into the acceptable range. The flow channels are made wide enough to allow for flowing water to carry through any amounts of particles including sand without trapping thereof inside the unit.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF THE PREFERRED EMBODIMENT OF THE INVENTION

A detailed description of the present invention follows with reference to accompanying drawings in which like elements are indicated by like reference letters and numerals.

Figure 1:
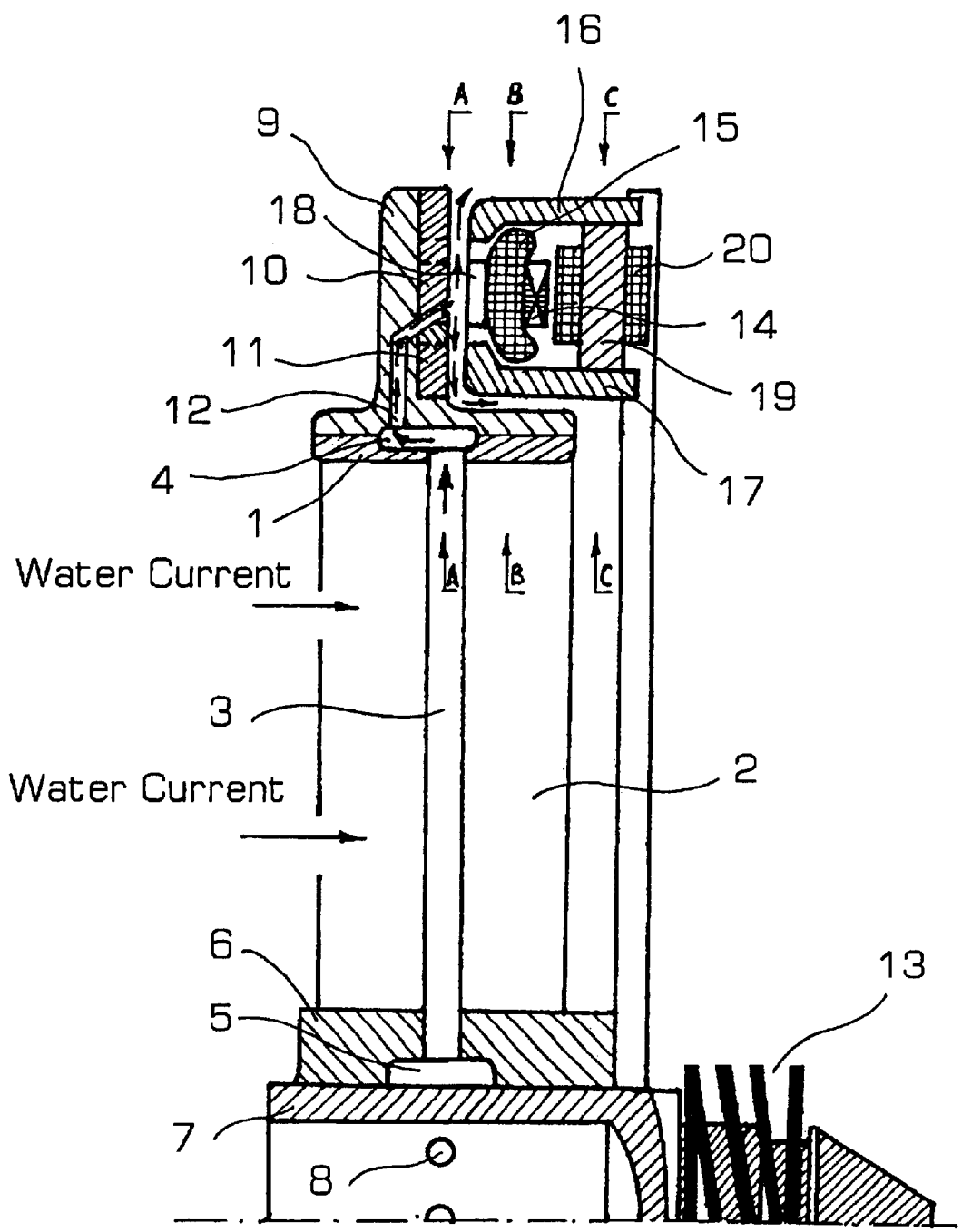
FIG. 1 is a side cross-sectional view of the generator of the invention.

The generator is shown in a side view cross-section on FIG. 1. The three-phase alternating current generator is combined with a turbine unit. The turbine consists of a peripheral rim 1 containing the vanes 2 and the hollow shaft 7. The vanes 2 contain the fluid channels 3 connecting the cavity 4 of the peripheral rim 1 and the cavity 5 of the central rim 6. Rim 6 is attached to the hollow shaft 7. Shaft 7 has an ability to move in the axial direction and is supported by a fixed axis of the stator (not shown on the drawing). Axial movement of the shaft 7 supported by a spring 13 causes the rotor to move axially along the axis as well. The hollow shaft 7 is opened to the incoming water flow and contains a series of openings 8 to fluidly connect the channels 3 with the water flow at all times whether the rotor is turning or not.

Figure 2:
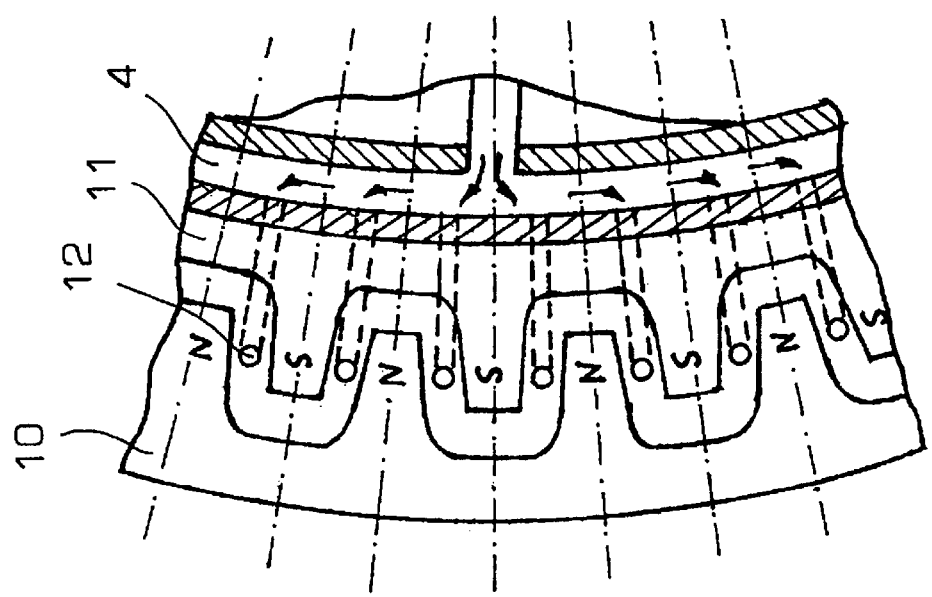
FIG. 2 is a rear cross-sectional view (against the direction of the water flow) of the generator along the section A—A from FIG. 1 showing the details of the rotor of the device.

A T-shaped ring 9 is attached to the outside of the peripheral rim 1. The T-shaped ring is made of a magnetically inert material such as a polymeric composite. It contains a system of permanent magnets consisting of an outside ring 10 and an inside ring 11. Both rings are made of a permanently magnetic material. The rings have a series of teeth magnetically charged to be of the same polarity within a ring. The shape of the teeth and their position on the T-shaped ring 9 is such that a system of interweaving alternating magnetic poles is achieved as shown in detail on FIG. 2. The space between the magnetic rings 10 and 11 is filled with a hard non-magnetic material such as epoxy for example to provide for a single smooth surface of the entire internal face surface of the rotor oriented perpendicular to the central axis of the device and positioned against the stator. Openings 12 are provided in these spaces to fluidly connect the cavity 4 through channels 3 to the area of the internal face surface of the rotor.

An auxiliary pump is provided (not shown on the drawings) to pump a constant volume of water along the channels 3. This pump may have any generic design such as for example a piston or plunger design and is driven by a turning rotor from the incoming water current. It is essential that the pump provide a constant amount of water flow regardless of the resistance along the channels 3 and inside the space between the internal face surface of the rotor and the external face surface of the stator.

Figure 4:
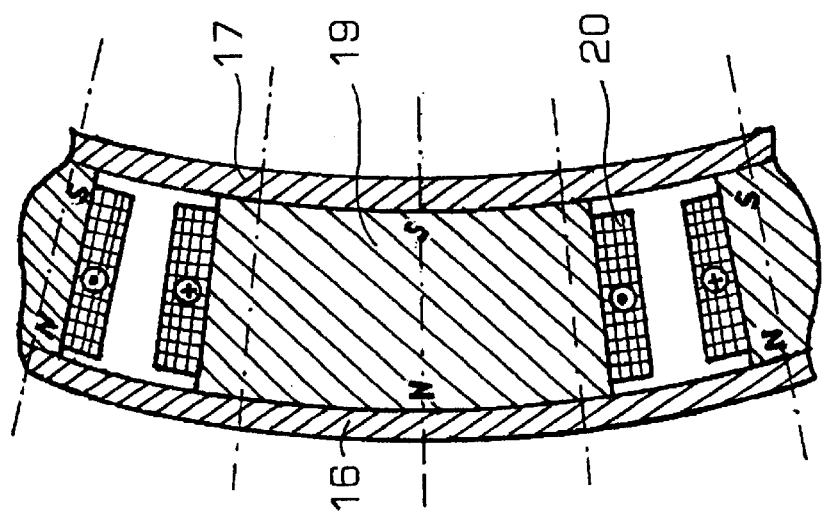
FIG. 4 is a front cross-sectional view in the direction of the water flow along the section C—C from FIG. 1 showing the details of the stator.
Figure 3:
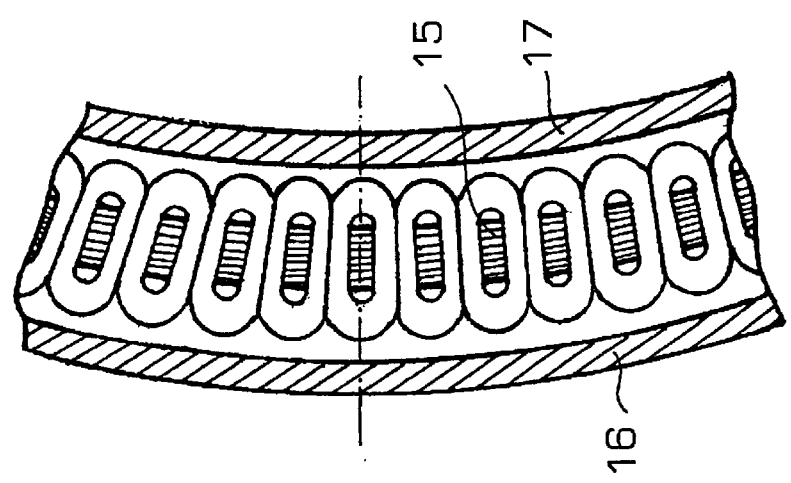
FIG. 3 is a front cross-sectional view in the direction of the water flow along the section B—B from FIG. 1.

The stator of the generator includes a magnetic core 14 containing appropriate cavities to accept the three-phase electromagnetic coil system 15. The external 16 and the internal 17 rings of the magnetic inductor 19 are extended around the coils 15. They are positioned to form a single external face surface of the stator along with the non-magnetic spacer 18 positioned next to the coils 15 as shown on FIG. 1 and more particularly on FIG. 3. The external face surface of the stator is perpendicular to the central axis of the generator. Activation coil 20 is positioned about the inductor 19 between the rings 16 and 17 as shown on FIG. 4. All these arrangements are rather typical for three-phase permanent magnet electrical generators of this type (except for the spacer 18) and therefore are not described in more detail here.

The generator of the present invention works in the following way. The incoming water current pushes on the vanes 2 and causes the rotor to turn. The permanent magnets of the magnetic rings 10 and 11 pass in front of the three-phase coil system 15 as well as the external and internal rings 16 and 17 generating electricity. The energy effectiveness of the generator of the present invention depends directly on the value of the axial gap formed between the internal face surface of the turning rotor and the external face surface of the stator. Ideally, this gap should be maintained in a very narrow range of about 0.15 to 0.20 mm over a broad range of working parameters for as long as possible to extend the operational time of the device. This is achieved in a way, which is described in more detail below.

A combination of axial forces acting on a rotor defines the axial gap. These forces include the pushing forces to move the rotor away from the stator and the pulling forces to move the rotor towards the stator. The pushing forces include the force of a spring and a hydrodynamic axial force between the rotor and the stator. The pulling forces include the electromagnetic attraction force between the coils of the stator and the permanent magnets of the rotor as well as the axial hydrostatic pressure force on the rotor from the incoming water current.

Before operation of the generator, the rotor is subjected to mostly one force, that being the spring force and is moved away from the stator so the axial gap is the largest. As the generator is turned on, the rotating permanent magnets are attracted to the energized coils of the stator, that force exceeds the spring force and the rotor starts to move in closer to the stator. At the same time, the auxiliary pump provides a constant flow of water into the channels 3 and further through openings 12 into the space between the rotor and the stator. As the rotor moves in, the axial gap is reduced and the resistance to flow is increased. The constant flow pump still provides the same flow of water as initially. Increased resistance therefore causes hydraulic pressure against the internal face of the rotor to increase causing an additional axially pushing hydrodynamic force until the point when the balance of forces is achieved. The flow output capacity of the auxiliary pump is chosen in such a way as to cause this equilibrium of forces to occur when the axial gap has reached its target range.

Importantly, as the surface of the rotor or stator wears out as a consequence of abrasion from the incoming flow contaminated with sand particles, the axial gap is maintained the same. This occurs due to the self-adjustment of the axial gap in reaction to the increase or decrease of the resistance to the flow from the auxiliary pump.

Another objective of the invention is to maintain the axial gap within acceptable range over a wide range of water currents. Such wide variations of flow occur frequently in the small rivers where the underwater generator of the present invention can be used most advantageously. In case of a substantial increase in the water current, the hydrostatic pressure on the rotor would increase and there is a danger that it would shift too close to or even touch down on the stator. However, the design of the hydraulic system of the rotor has provisions to compensate for that. In particular, as the water current increases, so will increase the rotational speed of the rotor of the device. That in turn leads to the increase in the output of the auxiliary pump which is typically proportional to the rotational speed of the rotor. In addition, the shape of the radial channels 3 is chosen in such a way that they act as a centrifugal pump themselves, further increasing the flow through the channels 3 towards the axial gap of the generator. The auxiliary pump in combination with the centrifugal pump formed by channels 3 form a combined pumping means of the device. As a result, increased flow will cause higher axial pressure on the internal face of the rotor pushing it away from the stator and keeping the axial gap within acceptable limits. Therefore, the design of the generator of the present invention provides for means to maintain the axial gap at a predetermined level over a wide range of operating conditions.

Although the invention herein has been described with respect to particular embodiments, it is understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An underwater generator comprising:

a stator with an external stator face surface, said surface oriented perpendicular to its central axis line, said stator containing an electromagnetic coils means sealingly imbedded therein and positioned against said external face surface, said electromagnetic coils means adapted to generate electricity when said external stator face surface is in a vicinity of passing alternating magnetic poles, said stator further including an axis aligned with said central axis line;

a rotor, including a spring-loaded shaft capable of turning about and axially moving along said axis, said shaft containing an opening in fluid communication with the water flow, a rotary vane system radially extending from said shaft for causing a rotation of said rotor when in a water current, a system of alternating permanent magnets sealingly imbedded in said rotor to form an internal rotor face surface, said surface oriented perpendicular to said central axis line and in a close proximity to said external stator face surface to form an axial gap therebetween, said rotor further incorporating a series of radial channels to fluidly connect said shaft opening to said axial gap; and an auxiliary pumping means connected to said channel system to provide a predetermined amount of flow into said axial gap.

2. The underwater generator as in claim 1, wherein said spring-loaded shaft is biased in a direction against said water current.

3. The underwater generator as in claim 1, wherein said electromagnetic coils system further comprising a magnetic core incorporating a plurality of three-phase electromagnetic coils and a magnetic inductor comprising an external ring, an internal ring, and an activation coil, said internal and external rings positioned around said magnetic core to form said external stator surface along with a non-magnetic spacer located next to said coils.

4. The underwater generator as in claim 1, wherein said system of alternating permanent magnets of said rotor further comprising a T-shaped non-magnetic ring supporting an outside magnetic ring of one magnetic polarity and an inside magnetic ring of the opposite magnetic polarity, said rings having teeth positioned in a spaced apart alternating order with each other to form a series of permanent magnets with alternating polarity, said series of permanent magnets positioned against said internal face surface of said rotor.

5. The underwater generator as in claim 4, wherein a space between said teeth is filled with a non-magnetic material and contains a series of openings in fluid communication with said series of radial channels.

6. The underwater generator as in claim 1, wherein said auxiliary pumping means is a constant flow pump.

7. The underwater generator as in claim 6, wherein said pump is driven by said rotor.

8. The underwater generator as in claim 7, wherein said predetermined amount of flow generated by said auxiliary pumping means is chosen so that the axial hydrostatic pressure from said flow on said internal face surface of said rotor is equal to other axial forces, whereby said axial gap is maintained within predetermined acceptable limits.

9. The underwater generator as in claim 8, wherein said axial gap is maintained between about 0.15 and about 0.20 mm.

10. The underwater generator as in claim 1, wherein said internal face surface of said rotor and said external face surface of said stator located on a periphery of said generator.

\* \* \* \* \*